(12) United States Patent
Pezzaniti

(10) Patent No.: US 6,241,881 B1
(45) Date of Patent: Jun. 5, 2001

(54) POLLUTION SEPARATOR AND FILTRATION APPARATUS

(75) Inventor: David Pezzaniti, Flinders Park (AU)

(73) Assignee: University of South Australia (AU)

( * ) Notice: Subject to any disclaimer, the term of this patent is extended or adjusted under 35 U.S.C. 154(b) by 0 days.

(21) Appl. No.: 09/554,300

(22) PCT Filed: Nov. 20, 1998

(86) PCT No.: PCT/AU98/00967

§ 371 Date: May 11, 2000

§ 102(e) Date: May 11, 2000

(87) PCT Pub. No.: WO99/27204

PCT Pub. Date: Jun. 3, 1999

(30) Foreign Application Priority Data

Nov. 21, 1997 (AU) .................................................. PP0481

(51) Int. Cl.[7] ............................... E03F 1/00; B01D 29/11
(52) U.S. Cl. .......................... 210/155; 210/170; 210/261; 210/512.1
(58) Field of Search ............................ 210/747, 170, 210/477, 485, 155, 261, 299, 304, 314, 435, 512.1

(56) References Cited

U.S. PATENT DOCUMENTS

| | | | |
|---|---|---|---|
| 4,689,145 | * | 8/1987 | Mathews et al. ............... 210/170 |
| 5,531,888 | * | 7/1996 | Geiger et al. ................... 210/170 |
| 5,643,445 | * | 7/1997 | Billias et al. ................... 210/162 |
| 5,753,115 | * | 5/1998 | Monteith ........................ 210/170 |
| 5,814,216 | * | 9/1998 | Filion ............................ 210/154 |
| 6,086,756 | * | 7/2000 | Roy ............................... 210/170 |

FOREIGN PATENT DOCUMENTS

| | | |
|---|---|---|
| 27253/95 | 2/1996 | (AU) . |
| 35237/97 | 2/1998 | (AU) . |
| 41 25 419 | 8/1992 | (DE) . |
| 297 09 859 U | 12/1997 | (DE) . |
| 10152881 | 6/1998 | (JP) . |
| WO 95/35145 | 12/1995 | (WO) . |

* cited by examiner

Primary Examiner—David A. Simmons
Assistant Examiner—Frank M. Lawrence
(74) Attorney, Agent, or Firm—Henry D. Coleman; R. Neil Sudol; William J. Sapone

(57) ABSTRACT

A stormwater pollution separator and filter apparatus to be fitted inline in a stormwater conduit. The apparatus has an inlet (1) receiving stormwater and leading through an inlet aperture (3) to a separation chamber (4) which then leads to a filtration chamber (5) which is positioned below the inlet aperture (3). A riser (6) leads from the filtration chamber (5) to an outlet (7) which is connected back to the stormwater conduit (3). The inlet opening is connected tangentially into the separation chamber (4) to create, in use, a swirl action in the separation chamber (4) by reason of the flow of the stormwater. The separation chamber (4) is positioned vertically above the filtration chamber (5), and the filtration chamber (5) has one or more filtration baskets (9) positioned in the filtration chamber (5) to receive substantially all the flow of stormwater from the separation chamber (4), the baskets (9) are spaced apart from a wall (10) defining a periphery of the filtration chamber (5). An overflow communicates directly between the inlet and the outlet, and a weir (14) is positioned in the overflow to prevent flow through the overflow unless a predetermined level of stormwater is exceeded.

26 Claims, 7 Drawing Sheets

POLLUTION SEPARATOR AND FILTRATION APPARATUS

This invention relates to a pollution separator and filtration apparatus, and preferably one that can be used for in-line separation in a stormwater drainage pipe.

BACKGROUND TO THE INVENTION

Stormwater is collected from various surfaces in urban environments and directed through various inlets to a stormwater collection network of pipes and then, often, deposited untreated into various receiving areas which are generally natural water bodies such as streams. rivers, lakes or the sea.

The stormwater collection network has to cope not only with stormwater but also a variety of debris, which ranges from gross material such as branches of trees, plastics containers, to smaller material such as sand and very fine material such as silt. Very often toxic or damaging substances such as orlanic wastes and heavy metals are also carried into the stormwater collection system. Thus oils may be collected from road surfaces and lead may be accumulated from surface depositions.

The collected debris causes difficulties in so far as causing visual pollution by the deposition of the gross debris into the natural water bodies. The accumulation of a great deal of sand and silt also causes problems in that natural waterways become clogged by the build-up of such material over-time, and additionally natural grasses and flora and fauna are adversely affected. Often toxic compounds such as heavy metals are carried by silt and as a result the build-up of silt is often toxic, having both short and long term ramifications to aquatic plant and animal life.

It has been recognised that the above is a problem and a variety of suggestions for the screening of debris from stormwater have been made and some have been implemented. Most of the very large debris is excluded from entry into the stormwater collection network by grates or bars or by reason of the size of inlet apertures, but medium size and fine debris passes through these screening devices.

There are some inherent problems with the design of apparatuses for the removal of debris from stormwater collection networks. One issue is cost in so far as the network of stormwater pipes is very extensive, and a great deal of debris is to be removed. Additionally there are quite large flows of stormwater and any filtration system should not impede the flow significantly otherwise flooding will occur. Flows of stormwater vary considerably and any filtration system should preferably be functional or at least not adversely affect the stormwater collections system at any of the expected flow rates. Additionally it is desirable that any apparatus fit together with existing stormwater management arrangements. Also desirable is that construction is simple and inexpensive and that it is inexpensive to clean and maintain.

It is known to use a vortex as a means for separation of solids in sewage lines and these vortexes assist in alleviating the tendency of blockage of static separation units by floatable solids. A vortex will tend to have the greatest velocity at its periphery and much lower velocities toward the centre of the vortex. as a result there tends to be a greater deposition of sediments and other non-floatable debris towards the centre of the vortex because velocity is such that the debris does not remain suspended. As a consequence separators using a vortex often have a collection container, or a take-off conduit below the centre of the vortex to remove sedimented material. The vortex is quite convenient as a means of removal of debris. because it allows for a longer transition time for floatable, a good proportion of which become waterlogged and therefore sink.

However not all debris settles, such as neutrally buoyant matter and some debris is too small and as a consequence for greater removal it is convenient to provide for a filter to filter the water that has been separated by the vortex. Not all stormwater separators that have a vortex will also include a filter. but these suffer the deficiency of permitting more debris through the separation plant One problem with providing a filtration means is the difficulty of having the filter mesh clogged as a result of high velocity particles lodging within the holes of the filter medium or with having floatables such as oils and greases foul up the holes of the filter.

It is necessary to remove debris from stormwater pollution separators from time to time, and separators almost invariably have some access for removal of the debris. Municipal bodies or contractors acting on their behalf are equipped in varying fashions to manage the clean-out of stormwater separators. What is desired is an efficient means of removal of both floatable and non-floatable pollution. In some municipal districts vacuum cleaners are provided that allows for removal of debris from a sump, however vacuum cleaners are not always available, and are relatively expensive to use on a routine basis. As a consequence it is desirable that stormwater separators use a bag or basket which can be lifted out of a sump of its respective separator and from which the majority of sinkables can be removed, and the bag or basket replaced in the sump. On the other hand it is desirable to minimise the cost of construction of these installation, and the addition of a filtration chamber separate from a separation chamber adds a considerable cost, It can be appreciated that because each of the stormwater separators is a sizeable construction it is desirable to minimise the cost of these installations

OBJECT OF THE INVENTION

It is an object of the present invention to provide a stormwater pollution separator and filtration apparatus that obviates or minimises any one of the above problems or at least provides the public with a useful choice.

SUMMARY OF THE INVENTION

In a first aspect this invention arises out of the construction of a separation apparatus for separating pollution from stormwater that results in improvements in the management of floatable debris.

In one broad form of a first aspect, and not necessarily the broadest form or only aspect the invention might be said to reside in a stormwater pollution separator and filter apparatus including an inlet for receiving stormwater from a stormwater conduit, said inlet leading through an inlet aperture to a separation chamber and then to a filtration chamber which is positioned below the inlet aperture, a riser leading from the filtration chamber to an outlet for connection with a receiving stormwater conduit, the inlet opening into the separation chamber to create, in use, a swirl action in the separation chamber by reason of the flow of the stormwater, the separation chamber positioned vertically above the filtration chamber, and the filtration chamber having one or more filtration baskets positioned in the filtration chamber to receive substantially all the flow of stormwater from the separation chamber, said baskets spaced apart from a wall defining a periphery of the filtration chamber, and an overflow communicating directly between the inlet and the outlet, and an overflow inhibition means therebetween to prevent flow through the overflow unless a predetermined level of stonnwater is exceeded.

The term conduit is to be understood in a broad manner, and is intended to include open channel or closed pipes that are used in the carriage of stormwater.

Preferably a riser aperture is the sole communication between the filtration chamber and the riser, and a riser aperture headwall positioned so as to be spaced below the inlet aperture, and below tops of the filtration baskets.

This then allows for collection of oils and other floatables within the separation chamber in between rain events.

In a preferred form the separation chamber extends above the inlet aperture and the inlet is bounded from the top by a headwall, so that the level within the separation chamber may elevate above the level of the inlet.

It is preferred that a sump is provided and in one convenient form the sump is provided at the base of the riser. Access to the sump in this latter form is provided from the top through the riser, thereby providing direct access independent of access through the separation chamber and filtration chamber. This means therefore that the baskets need not be removed for removal of silt and the like. A removable collection basket may be fitted in the sump for ease of maintenance.

For convenience of cleaning it is desirable that the one or more baskets are removable. Each basket preferably has at least an upper peripheral frame, which facilitates lifting, so that a spreader or other attachment can be made to lift up the basket evenly with a mechanical lifter. Preferably the baskets have an openable bottom, to facilitate discarding any pollution from the basket. The basket may, for example, have a lower peripheral frame, with a hinged lower pan with a catch that can be released to empty the contents of the basket. The lower pan may allow for filtration, by allowing for egress of water, or alternatively may be solid to collect some of the sediment. Ideally a rigid frame is provided for the whole of the basket for ease of handling and which is lined with a filter. The frame might be made for example of metal, which is suitable coated with an anti-corrosion coating, or which is made of a corrosion resistant metal.

The filters may be an expanded metal mesh, the expanded metal mesh being expanded to an array of lands defining an array of pores, each of the lands being angled relative to the plane of the mesh so that the pores all face towards one edge of the mesh, and in the baskets the mesh is positioned so that the pores are substantially all angled downwardly, thereby minimising clogging of the pores.

In one form at least two baskets are provided each with a separate upper frame. In this form it is preferred that the frame is supported spaced below the inlet aperture so that there is a region free of obstruction between a lower part of the inlet aperture and the top of the baskets. In this form it is also preferred to provide a boom means, whereby the boom means is able to be positioned at the surface of resting water, such as might occur between rain events, and extend below the surface so as to act as a boom whereby oils and grease can be localised to that portion of the water surface occupied by a respective basket. This means therefore that, on cleaning, the respective basket can be raised, and the debris, filter and frame drag with it oils and grease associated with it, and there is no influx of other oils or greases from other sector, or on replacement that such influx does not occur. The filtration chamber can thus be cleaned entirely, and the removal of oils and greases can more readily be achieved.

The boom means may take the form of splitter plates which can be raised and lowered, so that it might be stored above the normal resting level of the water within the filtration chamber but more preferably below and in line with an uppermost part of the baskets.

The inlet has a headland, which has a height the same as or lower than the weir, so that there is no escape of floatables over the overflow. This therefore leads to the accumulation of any floatables above the filtration baskets and reduces the chance of oils and other floatable spilling over the weir during high flow events.

It will be understood that it is preferred that the inlet and outlet are configured to connect between two ends of an in line stormwater conduit so that the separation apparatus can be fitted into an existing stormwater conduit.

In a preferred form a single upright treatment chamber makes up the separator and the filtration chamber, and that a closure is provided at an uppermost portion thereof for access to both from above. Preferred is a circular horizontal cross sectional integrally formed wall, such as a pipe, with a substantially constant cross section vertically, although this might alsobe provided with segments of a pipe. This facilitates the construction, and allows for ready removal of the filtration baskets.

The weir can be of a physical construction or alternatively might be a hydraulic weir created by flow out of the outlet.

In another aspect, the invention could be said to reside in a stormwater screening apparatus comprising:

an upper portion and a filtration chamber separated from one another by a floor;

a stormwater inlet leading into an inlet portion of the apparatus said inlet portion positioned within an upstream end of the upper portion;

a stormwater outlet directing water away from an outlet portion of the apparatus;

a treatment portion of the apparatus including a separation chamber in the upper portion receiving stormwater from said inlet portion, at least one filtering aperture passing through the floor to allow for flow of stormwater from the separation chamber to the filtration chamber, a filter fitted to filter stormwater passing through the filtering aperture;

the flow of stormwater being sufficiently supported by the floor to allow for distribution within the separation chamber;

a outlet aperture to allow flow from the filtration chamber to the outlet portion of the apparatus;

an overflow communicating directly between the inlet portion and the outlet portion.

This then permits distribution of storm water within the separation cham ber which might direct the flow of stormwater in a manner that enhances separation of debris from water, and that might also reduce problems associated with blockage of the filters and backfill of debris back into the inlet pipe.

Preferably there are at least two spaced apertures, and the floor acts to distribute the stormwater therebetween.

Preferably the separation chamber is adapted for the redirection of stormwater flow from an entry direction. More preferably the redirection induces the formation of a swirl in the separation chamber. Swirls are known to deposit fine granular debris towards their centre and coarse or heavier material to the periphery and this then presents an opportunity to configure the location of the filtration apertures to advantage and preferably at least one of the apertures is positioned away from the periphery of the swirl. The precise position of the one or more apertures to take advantage of the swirl action might include a totally central location, or one that is positioned between the centre and the periphery or one that might include an overlap with the centre of the swirl but extends towards one part of the periphery.

The redirection of the stormwater flow might be achieved in the separation chamber by the shape of a sidewall of the separation chamber, which might be generally circular in plan view. However a redirection and a swirl could also be achieved by a side wall with an angular shaped plan view with the disadvantage that sedimentation is likely to occur at peripheral apices. Alternatively other means such as suitably positioned deflector barriers might play the same role of redirecting the flow.

In the case where there is a redirection means to redirect the storm water in the separation chamber or to create a swirl, at least one aperture will be position so that it will receive stormwater only once stormwater has been redirected. Thus in the case where there are a plurality of filtration apertures not all of them will require a redirection of stormwater to receive stormwater.

Preferably at least a first of said apertures is positioned to be spaced apart from one edge of the incoming flow in the upper portion being at a periphery of the swirl or redirection. So that even where the aperture is blocked or silted up stormwater is diverted around the aperture and the strong flow of the peripheral water has a clearing effect. The differential rate of flow within the separation chamber is thus utilised to advantage. One or more other apertures might be similarly positioned.

Preferably the outlet portion is positioned within the upper part of the chamber so as to facilitate fitting of the apparatus to existing stormnwater pipes.

Preferably overflow inhibition means are provided to inhibit flow of stormwater through the overflow until a predetermined flow is achieved.

In one form the overflow inhibition means comprises a weir blocking entry of water to the overflow until it reaches a predetermined level.

Preferably the outlet portion is located in a downstream end of the upper portion and said apparatus further includes the outlet aperture passing through said floor to permit stormwater to rise from the filtration chamber to the outlet portion or the overflow.

Preferably, in use, the velocity bead of water within the separation chamber is significantly lower than in the inlet portion so as to raise the level of water in said chamber and the overflow relative to the inlet portion, and to thereby prevent ingress of water to the overflow. Where the filters become blocked or for another reason flow through the separation chamber is reduced sufficiently, stormwater no longer enters the separation chamber and flushes from the inlet portion through the overflow so as not to block the stormwater pipe. Additionally any silt or other debris that has built up during low flow high debris rain events, can be flushed directly through the overflow. This then overcomes a problem of many of the suggested designs for screening apparatuses.

Preferably the level of the floor at the outlet portion is substantially the same as the level of the floor at the inlet portion.

Preferably the filter has a vertical height and may be columnar, so that a filtration surface is larger than the cross-sectional dimension of the at least one filtration aperture. More preferably the filter extends downwardly from the floor into the filtration chamber, so that debris is collected within the filter. In this form the columnar filter takes the form of a basket which in one form is removable so that the debris can be conveniently emptied. Even should the filter not be removable, debris may be removed by the use of a suction hose.

The filter may be constructed using a mesh with a suitable pore size to retain debris based on size. Where a columnar filter is used there is a quite large surface area available for filtration and the pore size can be quite fine and still provide an adequate flow rate through the filtration portion. The mesh may be made from a plastics material to avoid corrosion. Alternatively it may be made of a metal, perhaps of an expanded mesh, so as to perhaps better resist physical damage. The mesh may be suitably supported by a frame if required.

Where a plurality of filters are used the total cross sectional dimension of the filter can be quite large and the flow velocity through the collective area of filter is greatly reduced thereby enhancing filtering efficiency and reducing the chance of blockage.

The shape and dimensions of the filter can be varied to suit the particular application. It may only be necessary to have a squat filter with shallow walls where the depth is considerably smaller than the width of the filter, alternatively the filter may be deeper. Similarly the cross sectional dimensions of such a filter need not be constant, so that it may be tapered downwardly, or even rounded downwardly. It may also be desirable that a silt collecting arrangement be provided whereby the columnar or other filter includes a solid lower portion. The solid lower portion would act as a cup where silt and very fine material could be deposited.

A silt collecting depression may also be provided in the base of the filtration chamber where silt will have a tendency to collect. The provision of such a depression will facilitate cleaning whereby a suction cleaner need not be drawn over the entire base to remove silt but need only be used in the depression.

The filtration aperture need not necessary match the width of the filter, and the filter may be considerably wider, and fit under the floor, so as to extend under portions of the upper portion in addition to the separation chamber.

Additionally the filtration aperture need not necessarily be constrained within the separation chamber, and may extend through to the filtration inlet channel.

In one form a flow path of stormwater entering the separation chamber is offset from the direction of flow through the filtration inlet channel, so that in use stormwater is diverted to enter the separation chamber and filtration aperture. It is preferred not to receive stormwater directly from the inlet onto the filter. because this has the effect of building up a wall of debris wbich then backfills to the stormwater inlet blocking the apparatus and flow of stormwater. Additionally there is a problem that inertia can cause some of the debris to lodge firmly within the filter and thereby blocking or even damaging the filter.

In a specific form the separation chamber is elongate in the direction of the flow of stormwater through the stormwater pipe to which the apparatus is fitted, the inlet portion is at the upstream end of the upper portion of the apparatus, adjacent to one elongate side of the separation chamber, a filtration inlet channel extends along the said one side of the separation chamber away from the inlet portion of the apparatus and communicates with the separation chamber and is separated therefrom by a filtration inlet channel wall, said overflow comprising a channel extending adjacent to the filtration inlet channel on a side opposite to the separation chamber, said outlet portion positioned at a first end and preferably downstream of the separation chamber. Preferably the floor is substantially flat, and substantially level.

It will be seen that in this specific form the flow path of the stormwater is reversed to the extent that the separation chamber is separated from the filtration inlet channel. Generally it is envisaged that there will be a plurality of filtration apertures at least two, and the filtration inlet channel wall is envisaged to extend only to be adjacent to one of the filtration aperture that is most proximal to the inlet. Thus stormwater is diverted laterally for the inlet distal aperture, but needs to be reversed for the two inlet proximal apertures. It is also preferred that the filtration inlet channel wall does not seal the filtration inlet channel from the separation chamber, but acts only as a weir, so that at lower flows of stormwater the filtration inlet channel is fully separated from the separation chamber and therefore directs stormwater to the inlet distal filtration aperture, but at larger flows, stormwater spills over the filtration inlet channel wall directly to the inlet proximal filtration aperture. It can be seen that this construction generally directs most of the debris from low flow rate rain events with high debris to the inlet distal filtration aperture rather than to the remaining aperture. Depending upon the position, however, it may be desired that the inlet channel wall only extends adjacent a first half or none of the inlet proximal filtration aperture and this may be preferred where the one filter is inadequate to cope with debris from low flow rain events.

The position of the rising aperture may be varied but generally is required to be in the overflow or outlet portion so that the level of water in the overflow at least adjacent the inlet portion is higher than that of the inlet portion except during large flow rain events. This then inhibits flow through the overflow except during large flow rain events.

Furthermore this specific form gives a great degree of flexibility in construction techniques and gives the capacity for modular construction so that the number of filtration apertures is readily increased by one or multiples of filtration apertures. The modular construction might envisage two end modules, an upstream end module including an upstream end of the separation chamber, the inlet portion. and an upstream end of the overflow and the separation chamber inlet channel, and a downstream end module comprising the oudet, and a downstream end of the separation chamber, and at least one central module capable of fitting between the two end modules, an end module or other central modules, the central module comprising at least a central portion of the overflow, a central portion of the separation chamber including one filtration aperture, and perhaps a central portion of the filtration inlet channel. The filtration chamber will be modular in a similar manner, and end modules and central modules may be provided separately for the filtration chamber, or may be provided together with a corresponding upper portion module. It will also be readily understood that other forms of the invention may also be made in a modular form. This modular arrangement provides for flexibility to increase the capacity or reduce the capacity as appropriate for a particular location.

BRIEF DESCRIPTION OF THE DRAWINGS

For a better understanding, the invention will now be described with reference to a two illustrated embodiments wherein.

Figure 1:
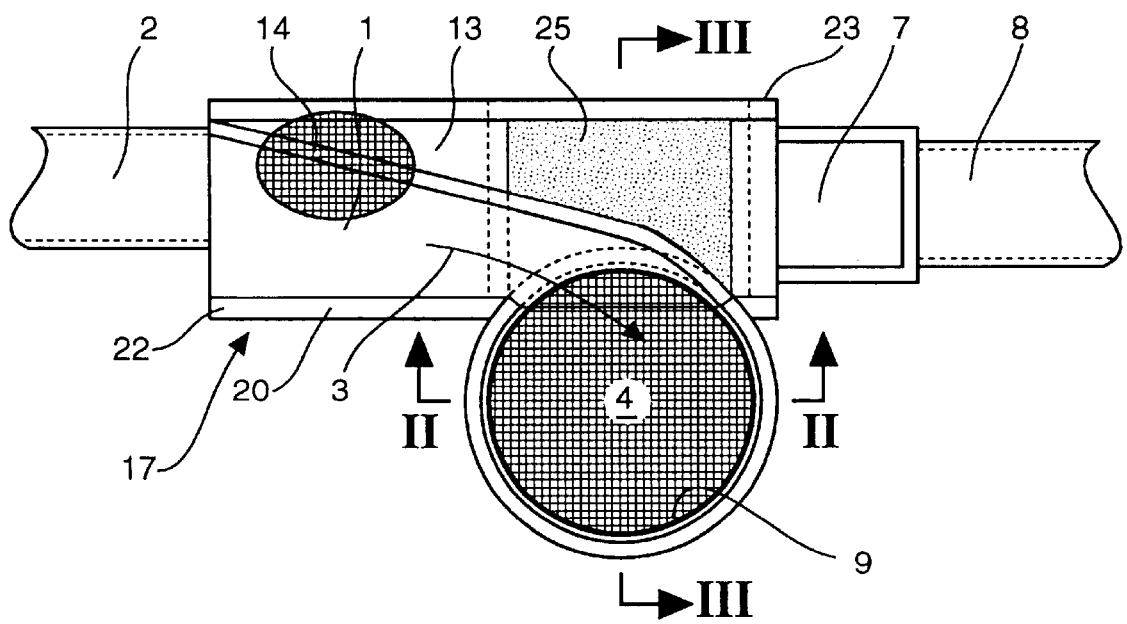
FIG. 1 is a plan view of the first embodiment of this invention, viewed from above, showing the general layout of the stormwater separator.

Dimensions of certain of the parts as shown in the drawings may have been modified and/or exaggerated for the purposes of clarity of illustration.

DETAILED DESCRIPTION OF THE ILLUSTRATED EMBODIMENTS OF THE INVENTION

Generally both stormwater separation apparatuses illustrated in FIGS. 1 through 7 comprise an inlet (1) that receives water from a stormwater conduit (2). The inlet leads through an inlet aperture (3) into a separation chamber (4). A filtration chamber (5) is positioned below the separation chamber. A riser (6) leads from the filtration chamber to an outlet (7) which connects with a stormwater receiving conduit (8). One or more filtration baskets (9) are positioned in the filtration chamber and are spaced apart from a wall (10) defining the filtration chamber. A riser aperture (11) leads from the filtration chamber to the riser, and a riser headwall (12) is spaced below the inlet (1). An overflow (13) communicates directly between the inlet and the outlet, and a weir (14) is positioned to prevent flow through the overflow unless a predetermined level of stormwater is exceeded.

Figure 2:
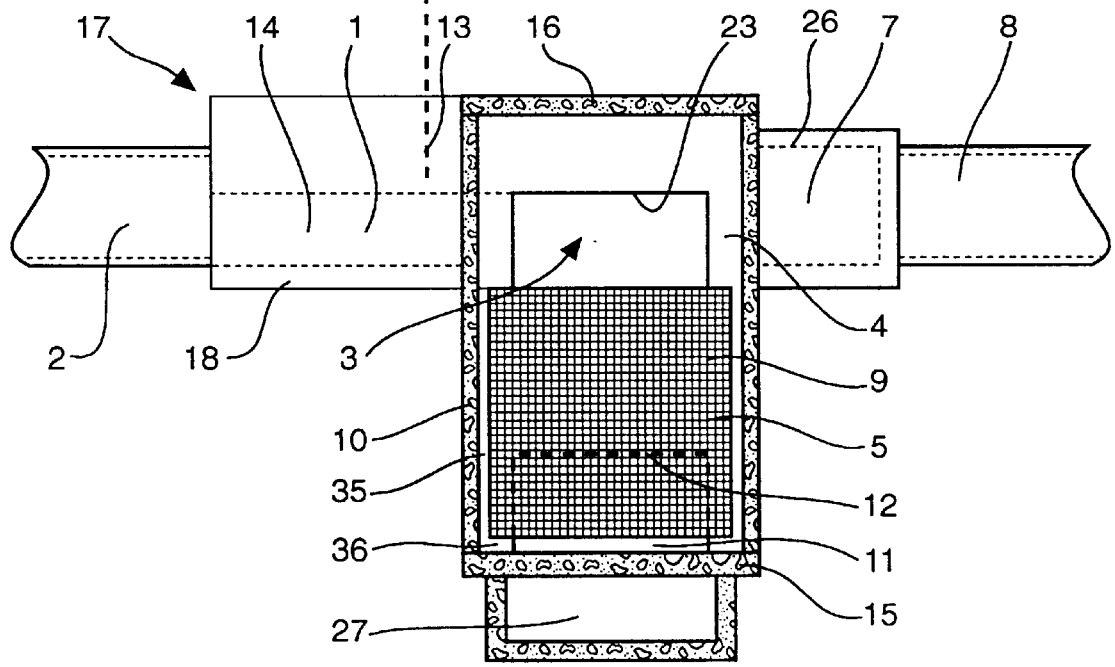
FIG. 2 is a side elevation through section II—II of FIG. 1.
Figure 3:
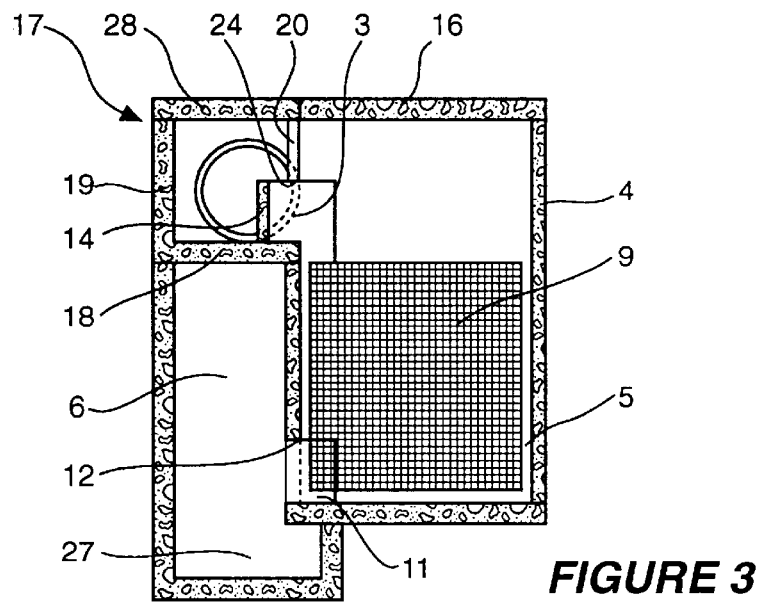
FIG. 3 is a side elevation through section III—III of FIG. 2.

Turning now to constructional details and in particular to the first embodiment illustrated in FIGS. 1, 2 and 3. A single, vertically aligned concrete pipe forms a vertical wall (10) for both the separation chamber and the filtration chamber, although it will be understood that the vertical wall might be made in segments. The effect of this is that both separation and filtration chambers form substantially one treatment chamber having substantially constant horizontal cross sectional dimensions. The bottom of the treatment chamber is defined by a concrete base (15) and the top is formed by an openable lid (16), which lid might be of a concrete, metal, plastics or other construction which might be lifted by hand or mechanical means depending on its weight. It can be seen that one advantage of this arrangement is the ease of construction of the treatment chamber, and ease of access to the filtration baskets, which need cleaning periodically. In the first illustrated embodiment the concrete pipe has a diameter of 1950 mm, and is approximately 3590 mm in height, with the filtration chamber extending up to approximately 2130, taken from the bottom of the base.

An elongate box shaped chamber (17) comprising a base (18), two elongate side walls (19, 20), a top (21) and ends (22, 23), is positioned in line with stormwater conduits (2, 8), and is offset with respect to an upper portion of the treatment chamber. The box shaped chamber has defined therein the inlet and the outlet End (22) includes therein a circular aperture into which stormwater conduit (2), in this case a circular pipe with a diameter 750 mm, can be sealing fitted. The weir (14) extends across the inlet portion of the box shaped chamber from end (22) through to a far portion of the concrete pipe, and ends at a distal portion of the inlet aperture (3) formed in the concrete pipe. The generally triangle shaped portion of the box shaped chamber comprising end (22), weir (14) and proximal wall (20) might be regarded as the inlet (1) of the apparatus, because that is where flow of water is directed from stormwater conduit (2), other than when high flow events occur. The weir has a height of 540 mm. which falls short of the 750 mm height of the stormwater conduit (2).

The inlet aperture (3) has a linear length of approximately 1400 mm and a height of the aperture defined by an inlet headwall (23) extending level with the top of the weir. The inlet aperture is cut out of the vertical pipe, or more preferably the vertical pipe might be moulded with the inlet aperture already formed therein. It can be seen that the separation chamber extends considerably above the inlet headwall (23).

A region immediately downstream of the weir (14) in the box shaped chamber might be considered an overflow (13). Should the flow of storm water in the inlet be such that the level is raised above the weir, it will then spill over the weir into the overflow and directly to the outlet and the stormwater receiving conduit (8). It might be possible to arrange the stormwater separation apparatus in such a way that a weir is not needed, so that hydraulic pressure emanating from the outlet is such as to provide a hydraulic weir, up to a certain flow rate through the separation apparatus.

The outlet includes an outlet aperture (25) formed through the base (18) of the box shaped chamber (17) whereby to receive treated water flowing upward through the riser. An exit chamber (26) of smaller dimension than the box shaped chamber constitutes a final portion of the outlet, and is again formed of concrete. The receiving stormwater conduit (8) is sealingly connected with the exit chamber.

It can be seen from FIG. 2 that the level of the two stormwater conduits (2, 8) are substantially the same, with only a small drop as might be expected from the gradient at which stormwater pipes are normally laid. It can also be readily seen from FIG. 1 that both stormwater conduits are substantially in line. From this it will be understood that the separation apparatus can readily be installed into existing stormwater systems.

The filtration chamber leads off to the riser (6) via the riser aperture (11). The constructional features of the riser can best be seen in FIGS. 3 and 2. The riser is constructed of concrete to form a vertical box shaped structure, that readily fits under the profile of the elongate box shaped structure (17) and that is positioned adjacent a lower portion of the treatment chamber. The riser extends below the lowest level of the filtration chamber to form a sump (27), whereby heavier particles that have passed through the basket can settle. A downstream junction between the riser and the outlet may have a bevel or be curved so that restriction to flow is reduced. A separate riser lid (28) can be provided which gives direct access through the outlet aperture to the sump whereby a vacuum cleaner tube can be inserted to remove collected debris once it reaches an undesirable height. Alternatively the separate riser lid can provide access to remove a collection container from the sump, where one is provided.

Figure 4:
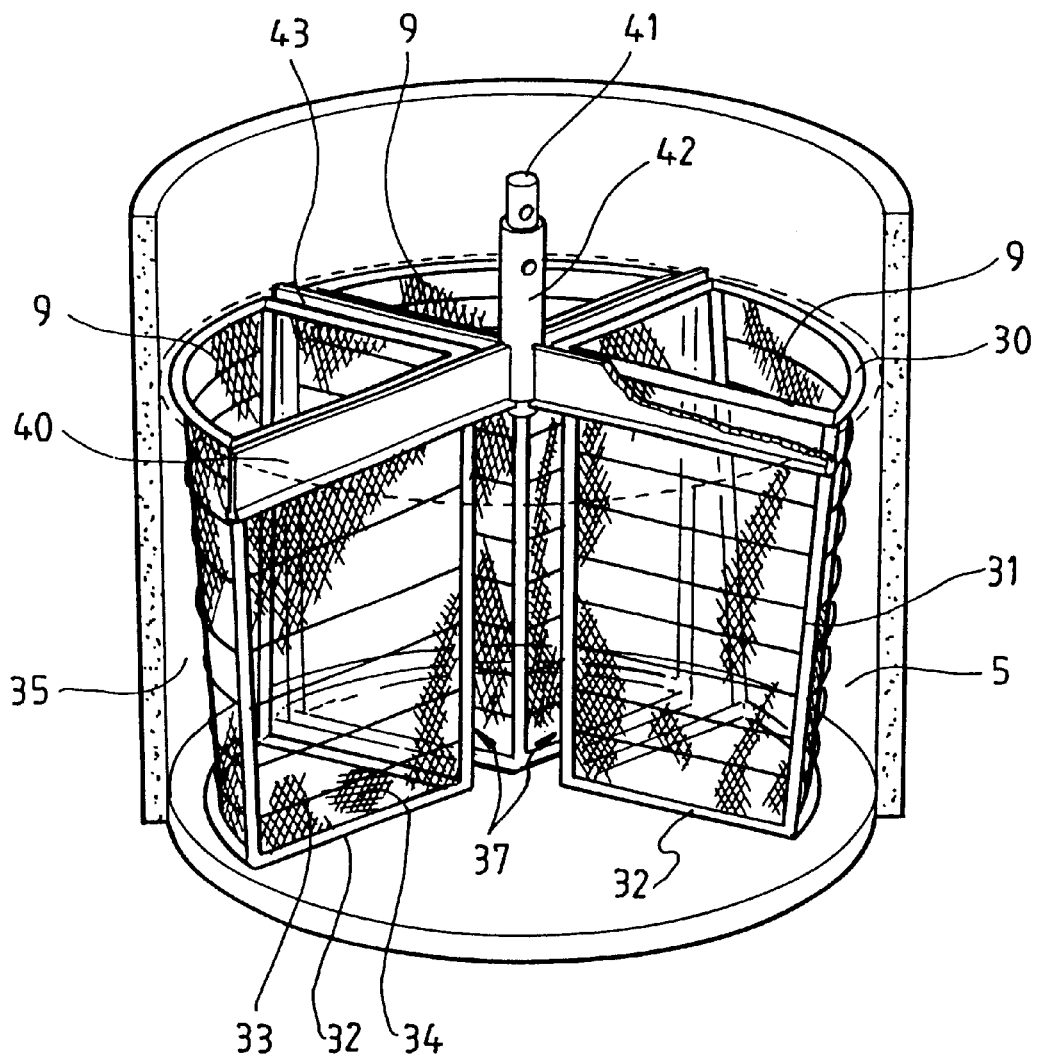
FIG. 4 is a schematic drawing of multiple baskets within the filtration chamber.
Figure 7:
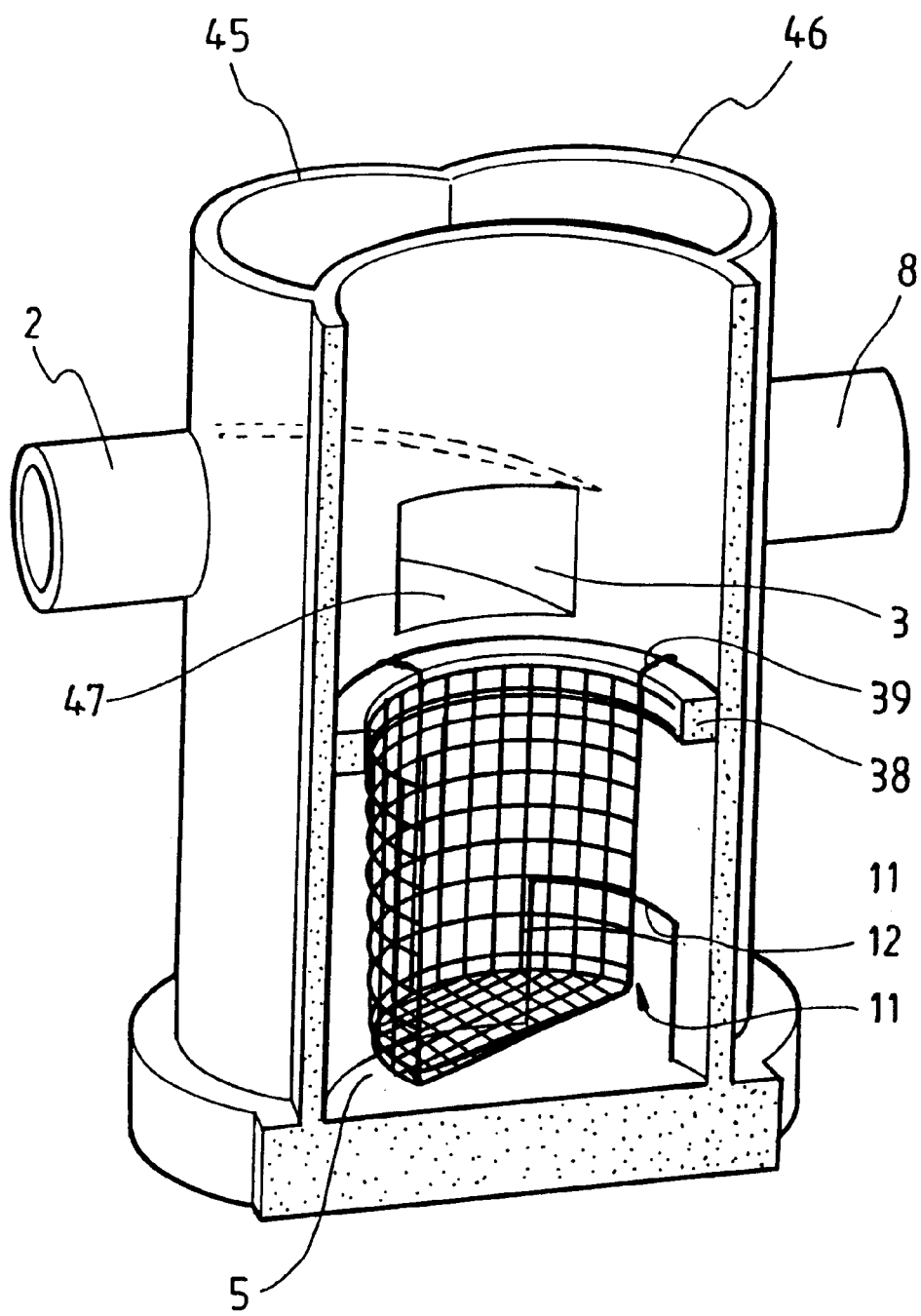
FIG. 7 is a a perspective part cross sectional view through the filtration and separation chambers of the second embodiment.

Constructional details of the filtration baskets are shown only schematically, but two forms are generally used, either a single basket, such as generally shown in FIGS. 2, 3, and 7, or a multiple basket form such as schematically shown in FIG. 4. Whilst the shape of the multiple basket form is somewhat different, the construction is similar. Turning to FIG. 4. A rigid uppermost frame (30) encircles an open uppermost end of the basket, and is constructed of tubular stainless steel. Vertical frame members (31) extend downwardly from the uppermost frame to join with a lowermost frame member (32), to thereby form the basic frame of the basket Ribs (33) will also generally be provided. The basket frame being made generally of steel, will be understood to be of a rigid structure. A flap (34) is hinged to the lowermost frame with a catch provided opposite the hinges so as to permit the flap to open, or alternatively to be locked into place against the lowermost frame member of the basket, however, details of the hinging are not shown in the illustrations. The basket frame is lined with a suitable filter material. The illustrated embodiments are lined with expanded metal mesh with pore size of about 1 mm by 3 mm. As with all expanded metal mesh, the pores of any sheet are all angled toward the plane of the mesh in one direction. In the present embodiment, the pores of the sheets of mesh on the sides of the baskets are all positioned facing downwardly, to avoid any adverse clogging of the filter. The sturdiness of the uppermost frame of the basket allows the ready mechanical handling of the baskets, so that even should there be significant weight in the full baskets, there will be minimal distortion of the basket, to facilitate lifting through the full length of the treatment chamber.

It will also be seen that the baskets are spaced apart from the walls of the filtration chamber. Where a single basket is used it will be seen that there is a peripheral gap (35) between the outside surface of the filter lining the basket and the filtration chamber wall (10). Similarly it will be seen that there is a bottom gap (36) between the bottom of the basket and the base (15) of the filtration chamber. Where multiple baskets are used as can be seen in FIG. 4 the baskets are each spaced apart as well, to form inter-basket gaps (37). Basket locating means are provided to ensure that the baskets can readily be positioned in place. In the case of the single basket, the basket locating means is in the form of a basket supporting annulus (38) (best seen in FIG. 7) fixed to an upper part of the filtration chamber wall, hooks (39) of other engaging means might be provided on the basket to catch onto the basket supporting annulus. The basket supporting annulus provides an advantageous means of supporting the basket in the present case, because it also acts as a barrier to passage of debris between the periphery of the basket and the filtration chamber wall, thereby enhancing the efficiency of the filtration process. Where other basket support means are provided, it might be desirable to provide an annulus or other barrier to the passage of debris between the basket and the filtration chamber wall. Another form of basket support means could be provided by at least three small pedestals extending upwardly from the floor. having a base portion so that the lowermost portion of the basket could rest thereon, and vertically extending portions, to locate a lowermost periphery of the basket. The provision of gaps adjacent the filtering surfaces facilitates the filtering process whereby the flow rate across the filter is greatly enhanced. The flow through stormwater conduit (2) is determined by the volume of water needed to pass through a pipe of cross sectional diameter of 750 mm, whereas the flow rate across the filter is reduced many fold, the rate being dictated by the total area of the filters carried by the one or more baskets. The net effect of this is that any debris that is of a similar size to the pores of the filter will not be forced thereinto, jamming up the pores. Similarly the pressure loss occasioned by passage through the filter is minimal. It will be understood that this is especially so where multiple baskets are used.

It can be seen from FIG. 7 that the uppermost portion of the illustrated filtration basket is positioned so as to be spaced below the lowermost edge of the inlet. Thus water must drop below the inlet level before being filtered, this then prevents clogging of the upper portion of the filter with oils and other floatable once a rain event has subsided. Whilst this is desirable it is not essential.

It can also be seen in FIG. 4 that in the case of multiple baskets it is desirable to use a boom means which in this case takes the form of vertically adjustable splitter plates (40). These are supported on a splitter plate shaft (41) and welded to a splitter plate collar (42) which can slide between at least two positions on the splitter plate shaft. In use for a rain event the splitter plates will be located so that an upper edge (43) lies adjacent the uppermost frame of the baskets. The splitter plates thus act as a barrier for passage of debris between the multiple baskets. When it comes time to empty the basket the splitter plates can be raised so that they intersect the surface of the water in the filtration chamber, and act as booms, to divide the surface into, in this case, four quadrants. This localises any oil, grease or other floatables, and facilitates the removal of these, whereby when a basket is lifted up through the water surface, any floatable within a respective quadrant will either collect in the basket, in the case of solid floatables, or in the case of oils, will coat the basket or debris therein, and a majority will be removed. When the basket is emptied, cleaned and then returned the respective quadrant will remain relatively clean, and the floatable in the remaining three quadrants will be localised therein. The remaining three quadrants can be cleaned in like fashion. Without the splitter plates in place, whilst some of the floatable will be removed, it will be understood that the remaining floatables will spread throughout the surface and a far less thorough removal of floatable will be effected. It will also be understood that in the case of a single basket this form of splitter plate will have no function.

Figure 5:
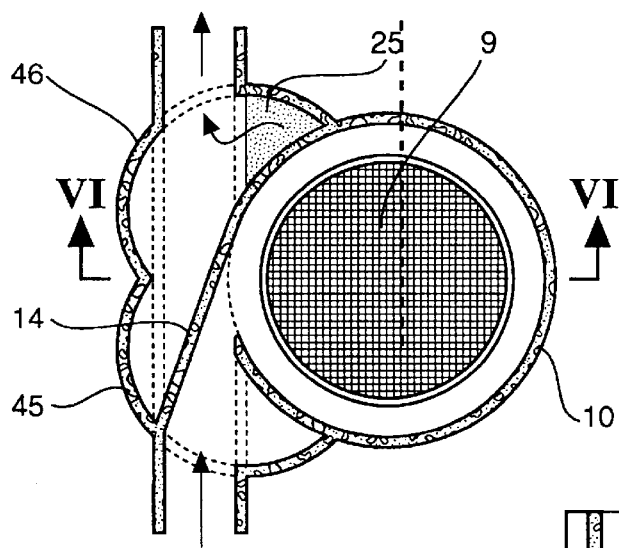
FIG. 5 is a plan view of the second embodiment, viewed from above.
Figure 6:
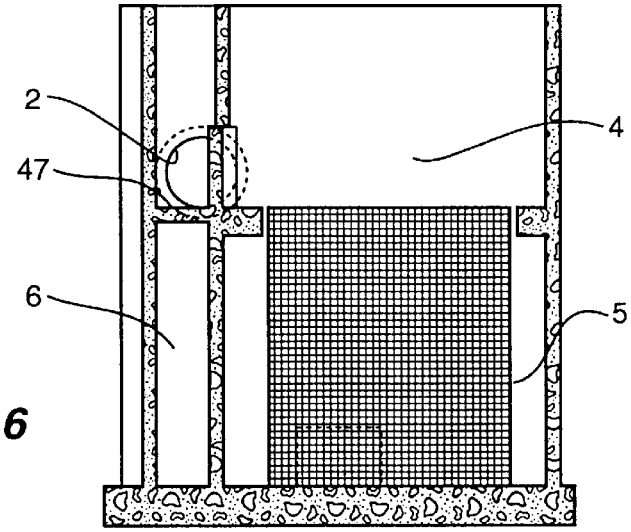
FIG. 6 is a cross sectional elevation of the second embodiment viewed through VI—VI of FIG. 5.

A second illustrated embodiment is illustrated in FIGS. 5, 6, and 7. The treatment chamber comprising the separation chamber and the filtration chamber is substantially the same as in the first illustrated embodiment. The inlet and outlet and riser are constructed in a different fashion but function in a similar way to the first embodiment. These are provided by two split pipes (45, 46) comprising an inlet chamber and the outlet chamber respectively. A floor (47) is provided substantially level with the stormwater conduits (2) and (8), except at outlet aperture (25). The riser is defined within the outlet chamber pipe (46) exiting the filtration chamber through a riser aperture similar to that of the first embodiment. This embodiment has no sump.

In use therefore during most rain events, water will flow through stormwater conduit (2) into the inlet, and is redirected by the weir (14) entering the separation chamber in a tangential fashion, which water flow is directed by walls of the separation chamber to form a swirl action. The effect of the swirl action is to keep the floalables suspended and in motion so as to reduce the chance of a backfill action, unless an excessive floatable load is delivered. Many of the floatables will remain in the swirl for some time until they become waterlogged whereupon they sink and are capture by the basket. In the case of the multiple basket arrangement the swirl action is substantially confined to being above the uppermost surface of the baskets, because the uppermost frames break up the swirl action thereby acting as a floor to the swirl action. The presence of splitter plates facilitates this effect. In the case of multiple baskets it is desirable to ensure that the surface of the baskets is spaced below the lowermost part of the inlet aperture so that there is room for the debris to swirl in a low flow event.

The sinkable debris will fall into the baskets, and the majority will be captured. In the case where the debris is small enough, a proportion will pass through the pores of the filters. Some will settle onto or in between the larger sinkable debris. Where the smaller debris is denser it will fall to the base of the filtration chamber and swept into the sump where one exists, or if is suspended, it may be carried out through the receiving stormwater conduit (8).

At high flow events, some of the water will flow over the weir (14). However any floatables will still be retained in the separation chamber by reason of the headwall of the inlet being aligned at the same level as the height of the weir. If the headwall was higher, then the floatable will freely escape out of the separation chamber and over the weir and out of the separation apparatus.

The illustrated embodiments of FIGS. 8 to 14 show a stormwater filtration screening apparatus which comprises an upper portion (101) and a filtration chamber (102) separated from one another by a floor (103). A stormwater inlet (104) leads into an inlet portion (105) of the screening apparatus. A stormwater outlet (106) directs water away from an outlet portion (107) of the apparatus. A filtering portion (108) of the apparatus includes a separation chamber (109) in the upper portion and filtration apertures (110a, 110b, 110c and 110d) extending through the floor (103) to allow for flow of stormwater from the separation chamber to the filtration chamber (102). A filter (111) is held within the filtering aperture so as to filter water passing therethrouoh. An overflow (112) communicates directly between the inlet portion and the outlet portion.

As can be seen the outlet portion (107) is located within a downstream end of the upper portion. A rising aperture (115) extends through the floor within the overflow (112) for filtered stormwater to rise up from the filtration chamber (102) to the overflow and from there past the outlet portion and out through the stormwater outlet (306).

Turning now in detail to some of the features of the third and fourth embodiments. The construction of the apparatus is largely of precast concrete components of a suitable density. The filtration chamber (102) is substantially rectangular in plan view and is defined within a base (120), four side walls, two of which are shown at (121, 122) and the upper limit of the filtration chamber defined by a lower surface of the floor (103). Additionally a baffle (123) is positioned adjacent to the outlet aperture (115) to retain floating debris. The floor is substantially flat and is constructed as a unitary concrete structure.

The upper portion (101) extends upwardly from the floor and is defined within four external side walls (125, 126, 127, and 128). The slormwater inlet (104) is fitted into the upstream wall (125), and the stormwater outlet (106) is fitted into the downstream wall (127). A removable flat plate lid (140) rests on the four external walls to enclose the apparatus.

As can be seen the separation chamber (109) is elongate in the direction of flow of water throuoh the inlet stormwater pipe (104). A filtration inlet channel (130) extends adjacent the separation chamber and is separated therefrom by a filtration inlet channel wall (131). The separation chamber is thus defined within internal walls (132, 133 and 134) and the filtration inlet channel wall (131). The filtration inlet channel wall (131) does not extend as high up as the lid (140) of the apparatus but is considerably lower, as perhaps best seen in FIG. 3, and thus acts as a weir. Thus where the level of water rises above the filtration inlet channel wall (131) the inlet water spills over and instead of travelling around the free end of the filtration inlet channel wall a more direct route is taken. The filtration inlet channel as shown can be seen to be of similar dimensions to the stormwater inlet.

The filters (111) are not flat across the filration apertures (110) but rather are shown as columnar in overall shape thus having a vertical heighl The filters air made of a mesh of a suitable pore size and are supported over the filtration apertures (110). The filter shown in FIG. 3 includes an upper mesh portion (135) and a solid lower portion (136). The solid lower portion takes the shape of a cup which has no apertures therethrough, and facilitates the collection of silt in the filter which otherwise would allow it to pass through. It will be understood that the shape of the filter can vary to suit the requirements of the facility in which it is received. The size of the filter also need not necessarily be commensurate with the size of the filtration aperture. Thus, for example, the filter may be fitted to the underside of the floor and extend under the separation chamber (109) as well as under the filtration inlet channel (130). Additionally the columnar shape need not be circular or elliptical, it may be of any shape able to collect debris and could be, for example, rectangular and the filtration apertures can also be rectangular. The mesh size can vary to suit the application, and the mesh sizes of the different filters of any one installation can vary. Thus it might be desirable to have the inlet distal filter (110a) (as shown in FIG. 1) as one with a fine mesh when compared to the filters in the other three filters shown. This then would collect the fine material generally washed down by a low flow rain event, instead of allowing it to pass through and can act as a quick reference, on inspection, to determine whether the screening apparatus needs cleaning.

Figure 8:
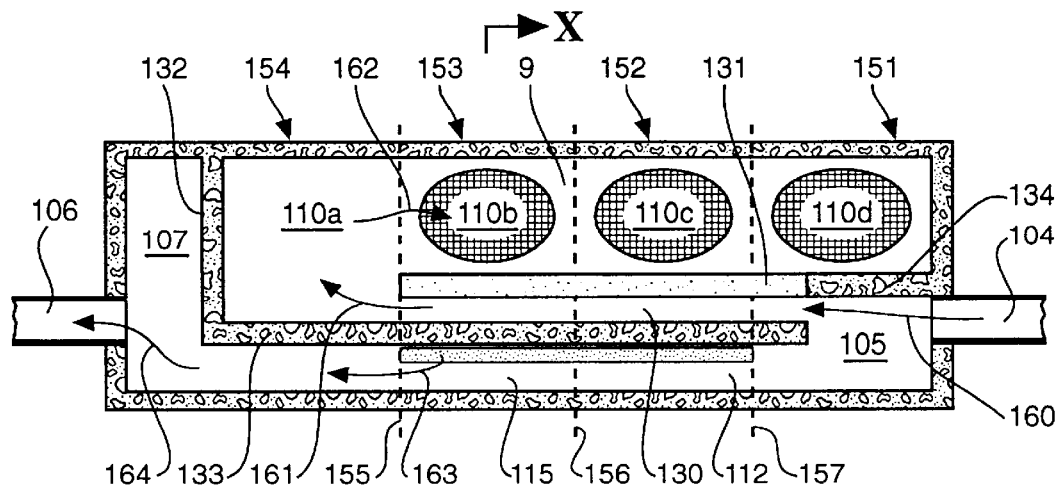
FIG. 8 is a plan view of a third embodiment of the upper portion of the stormwater screening apparatus showino the general layout of the upper portion.

The overflow (112) comprises a channel bounded by the floor (103), external wall (128) and internal wall (133). Internal wall (133) unlike filtration inlet channel wall (131) extends fully up to the lid (140) and thus the overflow is fully separated from the filtration inlet channel downstream of the inlet portion of the apparatus. The overflow extends essentially as a straight channel from the inlet portion (105) of the apparatus through to the outlet portion (107) of the apparatus, and thus communicates directly between the inlet portion and the outlet portion. The filtration chamber has a riser ponion spaced away from the filters and from which water exits through an outlet aperture (115) which passes through the floor in the overflow and in general use, water rises through the rising aperture (115) from the filtration chamber to the overflow, because the water level in the separation chamber is generally higher than that in the inlet portion of the apparatus. Aspects of stormwater flow will be dealt with in greater a detail below. The higher level of water within the overflow during most rain events provides control over the flow path of the stormwater so that the higher level of water within the overflow directs water into the filtration inlet channel (130) in preference to the overflow. It is considered that the rising aperture may be positioned substantially anywhere along the overflow (112) or the outlet portion, and including downstream of the stormwater outlet (106) provided that water passing through the rising aperture rises above the level of water within the inlet portion (115) of the apparatus. As can be seen in FIG. 8 the rising aperture is elongate extending along the overflow, and positioned approximately midway along the overflow channel. A second position can be seen in FIG. 9 where the rising aperture is position at the upstream end of the overflow. A low outlet aperture weir (145) is positioned around a periphery of the rising aperture in the second embodiment to prevent silt from being deposited into the rising aperture.

The lid (140) may be made of concrete construction, as the rest of the walls are, and rests on a ledge (150) of the external walls, and directly on internal walls (132, 133 and 134). A suitable hook or other device is preferably provided for ease of removal of the lid.

Whilst the preferred material of construction is concrete, other material for construction will also readily be apparent, and may include a plastics construction to make the apparatus light weight.

The apparatus may be used in-line, as with the illustrated embodiments, and in the illustrated embodiments the stormwater inlet (104) and stormwater outlet (106) at are substantially the same level, facilitating the positioning of the apparatus into the flow path of existing stormwater pipes. For end-of line applications or for fitting to new in-line storm water systems it may be desired to have the outlet at a lower level than the inlet, and perhaps leading out from the filtration chamber.

Figure 9:
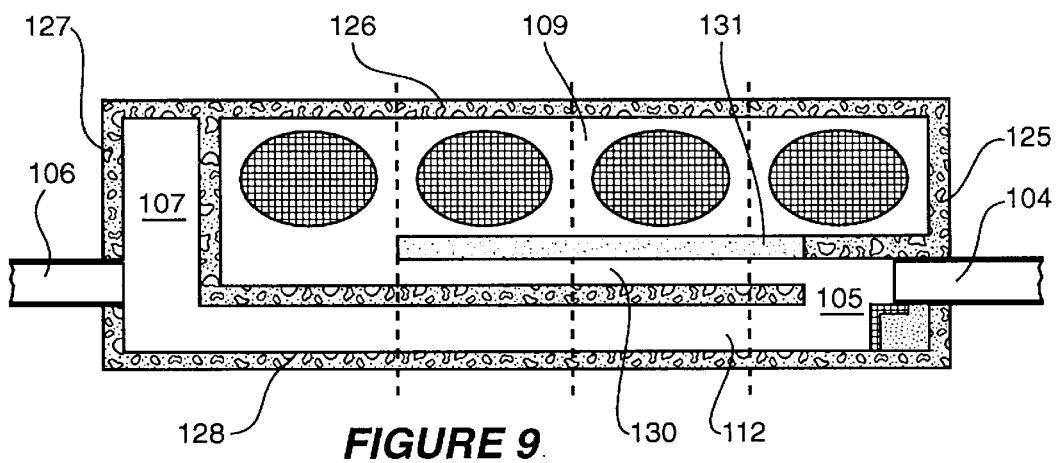
FIG. 9 is a similar view to that shown in FIG. 1 of a fourth embodiment of the upper portion.
Figure 10:
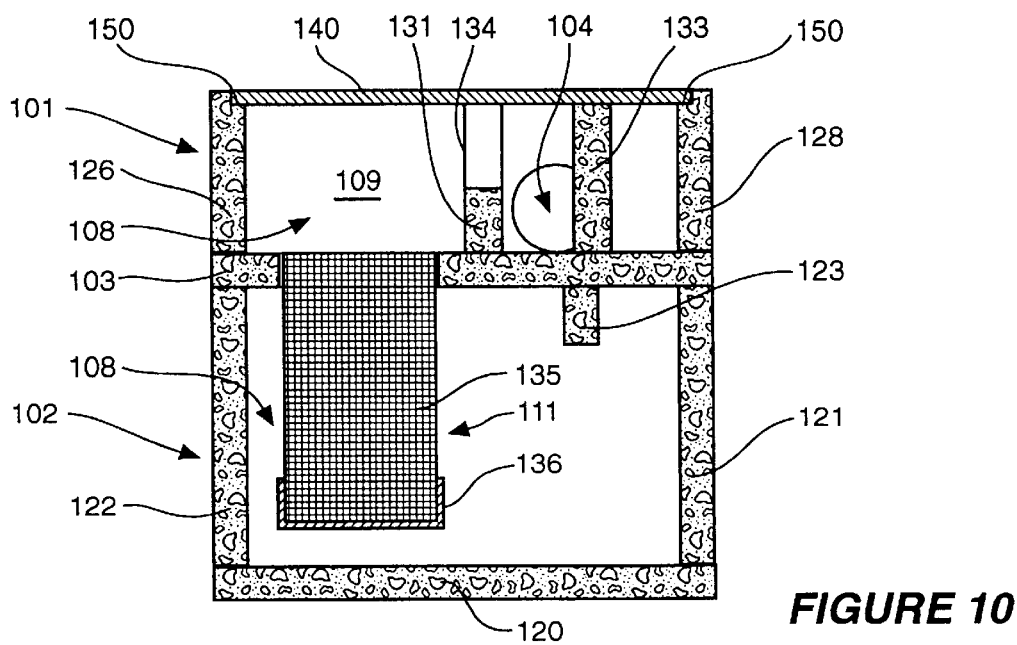
FIG. 10 is a cross sectional view through X—X of FIG. 8 showing the position of the filtration chamber relative to the upper portion.
Figure 11:
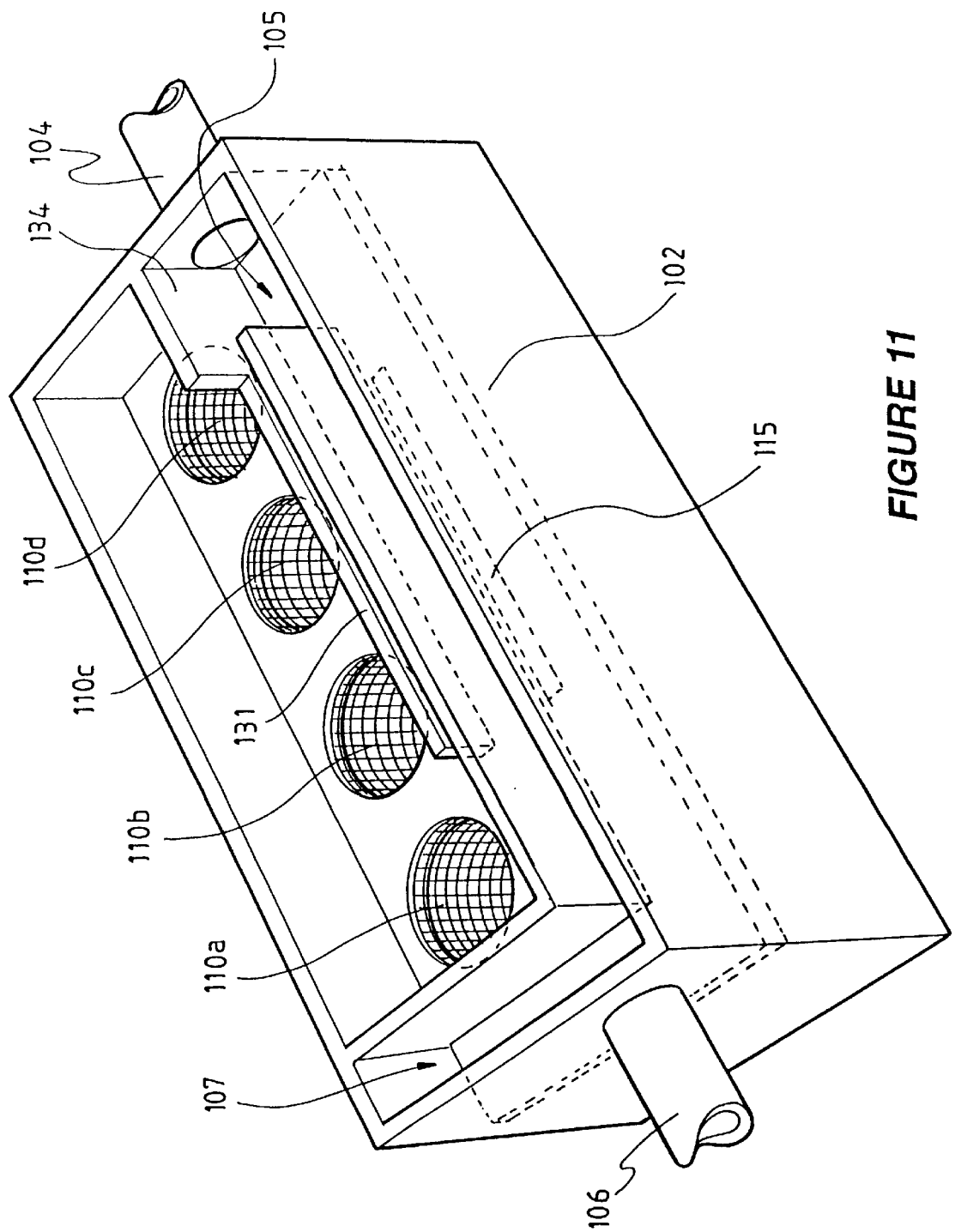
FIG. 11 is a partially cut away perspective view showing the manner of flow through the apparatus with a typical low flow rain event.

FIGS. 8 and 9 indicate that the construction of apparatus is modular, so that the apparatus is provided in four sections, (151, 152, 153 and 154), separated as indicated by broken lines shown at (155, 156, and 157). Two end sections are provided The upstream section (151) includes the inlet portion (105), and part of the separation chamber (109), the filtration inlet channel (130) and the overflow (112). The downstream end section includes the outlet portion (107), a downstream portion of the separation chamber (109), and the overflow (12). Shown also are two central sections (152, 153) and these each include a central section of the separation chamber (109), the filtration inlet channel (130) and the overflow (112). These sections are envisaged to include the corresponding part of the filtration chamber as well as the upper level, although it may be convenient to provide portions of the filtration chamber separately. Using the modular construction the capacity of the filtration arrangement as presently illustrated can be varied from two filtration apertures or more depending on the requirements of a particular stormwater pipe. Modular construction also provides benefits in terms of the cost of construction and for providing a range of product capacities using like parts.

The lid may also be provided in similar sections, and lifted separately for cleaning. Thus for cleaning the lid is lifted, the filters removed and emptied, or simply emptied using a suction device, and the filtration chamber is emptied using a suction device. Generally the basket (110a) will be inspected first because this is the basket that would be filled up first, and if this basket still has sufficient capacity left cleaning might not need to be effected.

The overall dimensions of the apparatus will also vary depending on the size of the stormwater pipe. In the present embodiments the stormwater pipe has a diameter of 300 mm and the arrangement has a width of approximately 1 metre, and a length of approximately 4 meters.

The general flow path of stormwater can be seen in FIG. 1 by the arrows (160, 161, 162, 163, and 164). Water enters (160) the inlet portion from the stormwater inlet, it is diverted (161) into the separation chamber which is offset from the filtration inlet channel and then enters (161) filtration aperture (110a). Where the flow is greater or filtration aperture (110a) is blocked the flow proceeds (162) to the further filtration apertures and from there to the filtration chamber. The filtered stormwater exits (163) from the filtration chamber and is directed into the overflow in the downstream direction and then travels (164) through the outlet portion through to the stormwater outlet.

It can be seen that the width of the separation chamber, (109) is much wider than the filtration inlet channel and the stormwater inlet and the flow thus slows considerably, it is believed that as a result of this that the level of the stormwater within the separation chamber is higher than within the filtration inlet channel (130) and the inlet portion (105) of the arrangement This level is reflected in the level of water in the overflow (112) as it passes through the outlet aperture (115) and consequently stormwater coming in from the stormwater inlet is inhibited from entering the overflow. During periods of higher flow, stormwater spills over the filtration inlet channel wall (131) directly to filtration apertures (110b) and (110c) thereby short cutting the route taken by the stormwater. During periods of very large flow stormwater with high debris levels, the debris will clog the filters and the separation chamber will fill, and stormwater simply cannot enter, because the level of water within the filtration inlet channel (130) is higher than the level of water in the overflow, and consequently stormwater flows directly through the overflow.

Generally in use the water passing through the inlet channel (130) is redirected on entry into the separation chamber (109), and has a tendency to form a swirl encompassing the upstream aperture (110a) or two upstream apertures (110a, 110b) depending on how far the inlet channel wall (131) extends.

Figure 12:
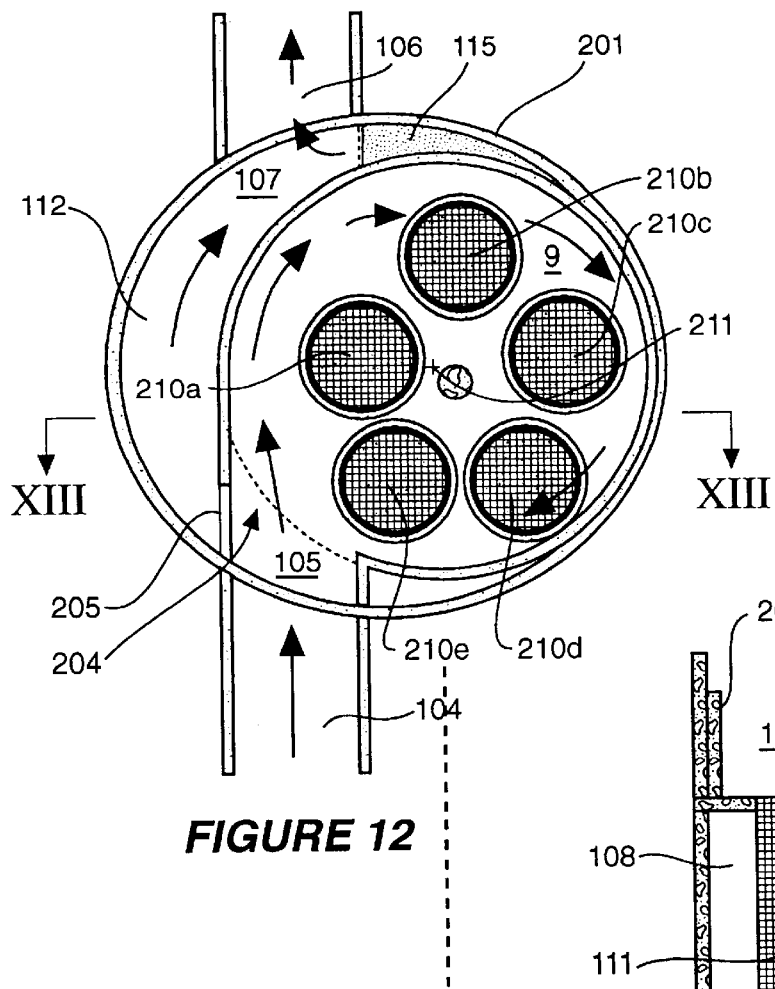
FIG. 12 is a top plan view of a fifth embodiment.
Figure 13:
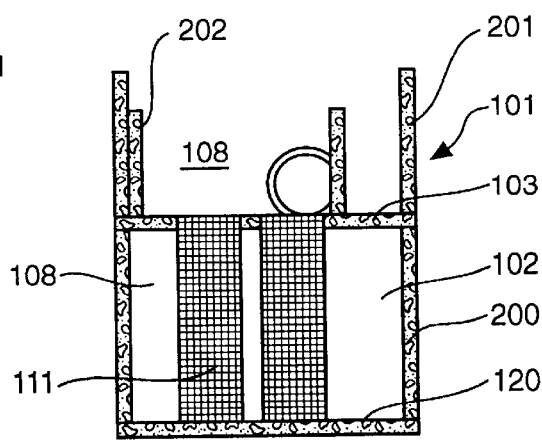
FIG. 13 is a cross sectional view through XIII—XIII of FIG. 12.
Figure 14:
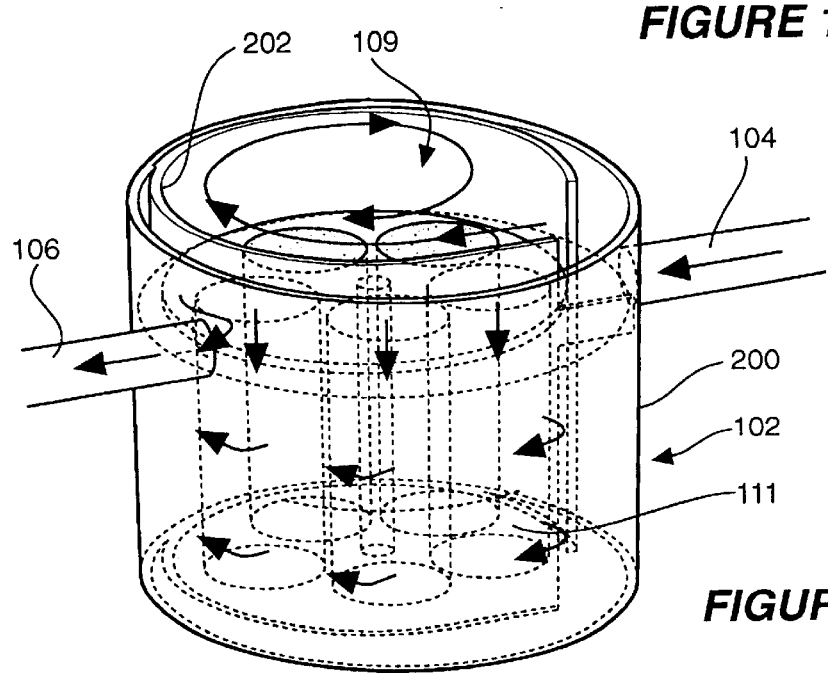
FIG. 14 is cutaway perspective view of the fifth embodiment of the invention, Similar reference characters indicate corresponding pans throughout the several views of the drawings.

The fifth embodiment shown in FIGS. 12 to 14 has a somewhat different construction but has a very similar action. As can be seen this embodiment has a component based on a cylindrical construction instead of the rectangular construction of the third and fourth embodiments. The filtration chamber (102) is thus substantially cylindrical in plan view and is defined within a base (120) and side wall (200) and the upper limit of the filtration chamber is defined by a lower surface of the floor (103). The floor is substantially flat and is constructed as a unitary concrete structure.

The upper portion (101) extends upwardly from the floor and is defined within an upper cylindrical external side wall (201). The stormwater inlet (104) is fitted through an upstream part of the upper wall (201) and the stormwater outlet (106) is fitted through a downstream part of the upper external wall. A removable flat plate lid rests on the upper wall to enclose the apparatus. A internal upper cylindrical wall (202) is positioned eccentrically of and inside the external upper cylindrical wall (201) and rests on the floor (103) or can extend to the lower floor (120) with openings therethrough to allow egress of water. Stormwater inlet (104) leads to inlet portion (105) and an inlet aperture (204) is formed through the internal wall (202) to receive stormwater flowing therefrom. A weir (205) may be formed on one side of the inlet portion to keep water up to a predetermined level before overflow is permitted.

Overflow (112) is formed between the internal wall (202) and the external upper wall (101) as a result of the eccentric positioning of one with respect to the other, and leads to an outlet portion (107) which leads to the stormwater outlet pipe (106) which carries water away from the apparatus.

The separation chamber (109) is cylindrical with the inlet aperture being offset from the centre of the separation chamber, and it will be readily appreciated that ingress of water leads to a swirling water flow with the greatest flow being at the periphery of the separation chamber. The illustrated embodiment includes five filtration apertures (210a, 210b, 210c, 210d and 210e). It can be seen that these are not positioned symmetrically around a centre (211) of the separation chamber but rather are offset away from an inlet side of the separation chamber. It may alternatively be desired to have the filter apertures disposed symmetrically, preferably spaced apart from the periphery of the separation chamber. The flow of stormwater through the separation chamber thus initially bypasses filter aperture (210e) partially bypasses (210a) and depending on the velocity of flow will progressively contact enter or pass over subsequent filter apertures (210b, 210c, 210d, 210e). It can be seen that the filter apertures each takes up a unique radial position relative to the periphery of the separation chamber ranging from filter aperture (210d) which is positioned up against the periphery, through to (210a) which is closest to but not overlapping the centre (211) of the separation chamber. This will therefore facilitate the collection of a range of debris that settle of various distances from the centre of the separation chamber. Additionally, the first filtration aperture (210a) being most distant from the internal wall defming the periphery of the separation chamber means that whilst it collects some of the initial debris it does not collect all, and therefore is less likely to present a blockage which backfills to the inlet pipe. Additionally the greatest velocity of water flow is around the periphery of the separation chamber, and the position of the first filter aperture therefore minimises the prospects of backfill because a high velocity channel of stormwater will tend to clear blockages or at least maintain a passage of stormwater between the first aperture and the periphery of the separation chamber open which downstream filter aperture can accommodate.

A lid support member (215) in the form of a column is positioned to give the lid extra support The filters (111) of this embodiment are similar to those of the third and fourth embodiments, and the filtration chamber operates in a similar manner, and so will not be described in further detail. The outlet aperture (115) is positioned in the outlet portion of the upper portion of the apparatus, and its function is similar to that of the third and fourth embodiment, in so far as it assists with biasing flow at the inlet to enter the separation chamber.

What is claimed is:

1. A stormwater pollution separator and filter apparatus including
an inlet for receiving stormwater from a stormwater conduit, said inlet leading through an inlet aperture to a separation chamber and then to a filtration chamber which is positioned below the inlet aperture,
a riser leading from the filtration chamber to an outlet for connection with a receiving stormwater conduit,
the inlet opening into the separation chamber to create, in use, a swirl action in the separation chamber by reason of the flow of the stormwater, the separation chamber positioned vertically above the filtration chamber, and the filtration chamber having one or more filtration baskets positioned in the filtration chamber to receive substantially all the flow of stormwater from the separation chamber, said baskets spaced apart from a wall defining a periphery of the filtration chamber, and an overflow communicating directly between the inlet and the outlet, and an overflow inhibition means therebetween to prevent flow through the overflow unless a predetermined level of stormwater is exceeded.

2. A storm water pollution separator and filter apparatus as in claim 1 wherein a riser aperture is the sole communication between the filtration chamber and the riser, and a riser aperture headwall positioned so as to be spaced below the inlet aperture, and below tops of the filtration baskets.

3. A stormwater pollution separator and filter apparatus as in claim 1 wherein the separation chamber extends above the inlet aperture and the inlet is bounded from the top by an inlet headwall, so that the level of stormwater within the separation chamber may elevate above the level of the inlet.

4. A stormwater pollution separator and filter apparatus as in claim 1 wherein a sump is provided at a base of the riser.

5. A stormwater pollution separator and filter apparatus as in claim 4 wherein access to the sump is provided from above through the riser, independent of any access through the separation chamber and filtration chamber.

6. A stormwater pollution separator and filter apparatus as in claim 4 wherein a removable sump basket is fitted in the sump for ease of maintenance.

7. A stormwater pollution separator and filter apparatus as in claim 1 wherein there are at least two filtration baskets which are separately removable.

8. A stormwater pollution separator and filter apparatus as in either one of claim 1 wherein the filtration baskets have a rigid upper peripheral frame by which the filtration baskets can be lifted.

9. A stormwater pollution separator and filter apparatus as in claim 8 wherein the baskets have an openable bottom.

10. A stormwater pollution separator and filter apparatus as in claim 9 wherein the one or more baskets have a lower peripheral frame, and a lower pan hinged to the lower pripheral frame, said pan can be opened by release of a catch to empty the contents of the baskets.

11. A stormwater pollution separator and filter apparatus as in claim 1 wherein a rigid frame is provided for the whole of each of the filtration baskets said rigid frame being lined with a filter.

12. A stormwater pollution separator and filter apparatus as in claim 11 wherein the filter is formed from an expanded metal mesh, the expanded metal mesh being expanded to an array of lands defining an array of pores, each of the lands being angled relative to the plane of the mesh so that the pores all face towards one edge of the mesh, and in the baskets, the mesh being positioned so that the pores are substantially all angled downwardly.

13. A stormwater pollution separator and filter apparatus as in claim 8 wherein the upper peripheral frame are each separately supported spaced below the inlet aperture so that there is a region free of obstruction between a lower part of the inlet aperture and the top of the baskets.

14. A stormwater pollution separator and filter apparatus as in claim 8 wherein a boom means is provided, whereby the boom means, in a first position, is positioned at the surface of resting water, such as might occur between rain events, and extend below the surface so as to act as a boom whereby oils and grease can be localised to that portion of the water surface occupied by a respective basket.

15. A stormwater pollution separator and filter apparatus as in claim 14 wherein the boom means takes the form of splitter plates which can be raised and lowered and in a second position is stored above or below the normal resting level of the water within the separation chamber or the filtration chamber.

16. A stormwater pollution separator and filter apparatus as in claim 2 wherein the inlet has a headland, which has a height the same as or lower than a top of the weir.

17. A stormwater pollution separator and filter apparatus as in claim 1 wherein the inlet and outlet are configured to connect between two ends of an in line stormwater conduit, so that the separation apparatus can be fitted into an existing stormwater conduit.

18. A stormwater pollution separator and filter apparatus as in claim 1 wherein the separator and the filtration chamber comprise a single upright treatment chamber, and a closure is provided at an uppermost portion thereof for access to both the separation chamber and the filtration chamber from above.

19. A stormwater pollution separator and filter apparatus as in claim 18 wherein the single upright treatment chamber is of a circular horizontal cross section with a substantially constant cross section vertically.

20. A stormwater pollution separator and filter apparatus as in claim 1 having swirl reducing means to reduce the swirl in the filtration chamber.

21. A stormwater pollution separator and filter apparatus as in claim 20 wherein the swirl reducing means comprises a floor separating the separator chamber and the filtration chamber, one or more filtering apertures passing through the floor to allow for flow of stormwater from the sepaation chamber to the filtration chamber, the one or more baskets fitted respectively to the one or more filtering aperture.

22. A stormwater pollution separator and filter apparatus as in claim 21 wherein the there are provided more than one apertures positioned to be spaced apart from one another relative to a centre of the swirl.

23. A stormwater pollution separator and filter apparatus as in claim 22 wherein at least a first of said one or more apertures is positioned to be spaced apart from one edge of the incoming flow in the separation chamber being at a periphery of the swirl or redirection so that even where the aperture is blocked or silted up stormwater is diverted around the aperture and the strong flow of the peripheral water has a clearing effect.

24. A stormwater pollution separator and filter apparatus as in claim 17 wherein the level of the floor at the outlet portion is substantially the same as the level of the floor at the inlet portion.

25. A stormwater pollution separator and filter apparatus as in claim 1 wherein the overflow inhibition means comprises a weir blocking entry of water to the overflow until it reaches a predetermined level.

26. A stormwater pollution separator and filter apparatus as in claim 1 wherein a flow path of stormwater entering the separator chamber is offset from the direction of flow from the inlet, so that in use stormwater is diverted to enter the separator chamber and the one or more filtration baskets.

* * * * *